United States Patent

Haddock et al.

Patent Number: 5,995,324
Date of Patent: Nov. 30, 1999

[54] PSEUDO-CONTACT SLIDER WITH RECESSED MAGNETO-RESISTIVE TRANSDUCER

[75] Inventors: Quinn Haddock, Longmont; Patrick R. Wacker, Louisville, both of Colo.

[73] Assignee: Maxtor Corporation, Longmont, Colo.

[21] Appl. No.: 09/083,700

[22] Filed: May 21, 1998

[51] Int. Cl.$^6$ .................. G11B 17/00; G11B 21/20
[52] U.S. Cl. ............................................... 360/103
[58] Field of Search ................... 360/103, 104, 360/97.01

[56] References Cited

U.S. PATENT DOCUMENTS

| | | | |
|---|---|---|---|
| 5,535,073 | 7/1996 | Brezoczky et al. | 360/105 |
| 5,650,892 | 7/1997 | Dorius et al. | 360/103 |
| 5,673,156 | 9/1997 | Chen et al. | 360/97.01 |
| 5,768,055 | 6/1998 | Tian et al. | 360/103 |
| 5,872,685 | 2/1999 | Park et al. | 360/103 |

*Primary Examiner*—John H. Wolff
*Attorney, Agent, or Firm*—David M. Sigmond

[57] ABSTRACT

A method of design of a magnetic recording slider and sensor geometry is disclosed which allows a magneto-resistive recording element to achieve a significantly reduced physical and magnetic spacing with a rigid magnetic recording disk in a disk drive, without resulting in thermal transients caused by sensor/disk contacts. The method utilizes pseudo-contact slider technology with an intentionally recessed MR sensor pole tip and alumina region. The reduced spacing achieved by pseudo-contact recording is significant compared to the spacing loss incurred by the proposed precision of the MR recording element, resulting in a net reduction in head medium magnetic spacing.

13 Claims, 3 Drawing Sheets

PSEUDO-CONTACT SLIDER WITH RECESSED MAGNETO-RESISTIVE TRANSDUCER

FIELD OF THE INVENTION

This invention relates to pseudo-contact recording, tribology and magneto-resistive heads. More particularly, to the thermal asperity effects of the disk-slider interface and the designs and methods for improving the use of magneto-resistive heads in near-contact and in-contact recording systems through intentional pole-tip rescission.

BACKGROUND OF THE INVENTION

In a conventional magnetic recording system, the rotation of the rigid magnetic disk causes a transducer or magnetic recording head to be hydrodynamically lifted above the surface of the recording medium. The hydrodynamic lifting phenomena results from the flow of air produced by the rotating magnetic disk. This airflow causes the head to "fly" above the disk surface. Of course, when the rotation of the magnetic disk stops or slows, the head element is deprived of its aerodynamic buoyancy and lands on the surface of the disk.

Magnetic heads typically comprise a rectangular slider body onto which is attached a transducer device along one portion of the slider body. Normally, sliders are made of various ceramic materials. For instance, a composition of alumina and titanium-carbide is one of the more common slider materials in use today due to its relative wear resistance. A variety of other materials have also been used as well. There are typically two types of transducers for magnetic recording, thin film or magneto-resistive (MR). Thin-film transducers can read or write. An MR transducer can only read. Hence a second thin film transducer must be used in combination with an MR transducer for full read/write capabilities.

A primary goal of hard disk drives is to provide maximum recording density in the hard disk. It has been found that the recording density that can be achieved using a magnetic recording transducer depends, in part, on the distance between the recording medium of the hard disk and the magnetic recording transducer. A related goal is to increase reading efficiency or reduce read errors, while increasing recording density. Problems associated with attaining these goals may vary depending upon whether the drive utilizes a thin film transducer for both reading and writing, or a magneto-resistive transducer for reading and a thin film head for writing.

From a writing or recording density standpoint, the transducer is ideally maintained in direct contact with the recording medium of a hard disk. Recording density decreases as the write transducer is elevated above the disk surface. By providing zero separation distance between the magnetic recording transducer of the slider and the disk, high magnetic recording densities are achieved. However, the hard disk typically spins at about or in excess of 4,000 r.p.m. and continuous direct contact between the slider and the transducer, on the one hand, and the recording medium, on the other hand, can cause unacceptable wear in both the recording medium, the slider and the transducer. Wear occurring in the recording medium can result in a loss of data. Wear occurring in the transducer can result in complete failure of the recording transducer requiring replacement of the slider housing the transducer, as well as loss of data.

A common approach to protecting the head/disk interface from excessive wear has been to coat the surface of the disk with a liquid lubricant. However, this can create an accumulation of debris on the head, including the lubricant and dust or dirt from the surrounding environment. Accumulation of such debris around the contact surface of the head leads to signal modulation caused by particle induced fluctuations in the heads. Accumulation of debris and other particulate matter can also create a dramatic increase in the wear rate as the debris is captured in the friction zone between the slider and the disk. The presence of any liquid lubricant in the zone can magnify this effect dramatically.

To prevent undue wear of the recording medium, slider and/or transducer while still maintaining acceptable recording density, the bottom surface of the slider is typically configured as an air bearing surface (ABS). High speed rotation of the disk causes a stream of air to flow along the surface of the disk. The ABS of the slider interacts with the flow of the air causing the slider to float about the hard disk surface. Hence, while the disk is spinning and the slider is positioned adjacent to the disk, the slider floats slightly above the disk, thereby substantially eliminating wear to either the disk or to the slider.

Although the conventional ABS slider design has been effective in preventing wear of the slider and/or transducer and the recording medium, optimum recording densities have been lost due to separation between the recording medium and the magnetic recording transducer of the slider.

From the standpoint of reading data from a magnetic disk, and similar to recording, reading efficiency decreases the farther the read element is from the disk. Because the signal to noise ratio decreases with increasing distance between the transducer and the disk, moving the transducer closer to the disk increases data storage bit density. Moreover, because MR transducers are more sensitive than thin film read elements, an MR transducer will read more efficiently, with less errors, than a thin film head at the same distance above the disk.

Conventional magneto-resistive elements disposed on sliders are designed with air bearing surfaces to fly above the surface of a rigid rotating magnetic recorded disk. Current disk drives with MR heads operate at an average head disk physical spacing of approximately 40 nanometers, with distribution ranging up to 75 nanometers. This range of spacing is required to account for slider and disk drive manufacturing tolerances, such as in the actuator and disk/spindle interface, and environmental conditions such as altitude and temperature, which would cause the slider to fly too low and make contact with the rigid disk. Contact of the magneto-resistive MR sensor with the disk surface has proven to cause an undesirable thermal transient due to friction, commonly referred to as thermal asperity. Thus, unlike inductive heads which are able to tolerate disk contacts without generating signal transients, use of MR heads has required the MR heads to fly above the disk surface resulting in less efficient recording density.

Based on the foregoing, a desirable solution would be to utilize a flying MR head transducer with as little spacing as possible between the disk surface and the transducer. With flying heads, however, the height is influenced in large part by the quality of the manufacturing process. Manufacturing tolerance includes the manufacturability of components such as the crown, camber, twist, etch depths of the slider, head-gimble interface, assembly tolerances and the very process of stacking and swaging parts together. If a precise suspension and alignment mechanism is required, such as with the transducer spaced only a few nanometers above the disk surface, the overall mechanical tolerances of various components must be correspondingly more precise. Such precision would be not only mechanically difficult, but exceedingly expensive.

The present invention removes sensitivities due to manufacturability by placing the slider in contact with the disk but recessing the MR transducer pole-tip. In this manner, precisely controlled mechanical flying is not necessary and increased recording and reading efficiencies due to head/disk proximities are achieved.

OBJECTS OF THE INVENTION

It is an object of the present invention to utilize pseudo-contact slider technology with MR sensor technology, to achieve reduced magnetic spacing without generating detrimental thermal asperities.

SUMMARY OF THE INVENTION

In one embodiment of the present invention, the intentional recession of the MR sensor pole-tip and surrounding alumina matrix are recessed from the plane of the air bearing surface on the order of 5–15 nanometers. This recession can be produced with conventional slider lapping and cleaning techniques. The recession of the pole-tip and the surrounding alumina will cause the slider contact point, which is in contact with a recording medium, to move forward of the MR sensor. Because the sensor area will not be in contact with the disk surface, thermal transients will be eliminated or significantly reduced. Thermal transients and variations are insulated from the MR sensor by the slider body material or other insulating materials deposited on the slider in front of the MR sensor. Slider pitch angle, dynamic pitch response and slider crown are designed such that the slider contact point remains in front of the MR sensor on the slider body material under all tolerance conditions. In this manner, reading errors will decrease and reading efficiency will increase, without incorporating expensive mechanical design and manufacturing solutions.

Another embodiment of the present invention is to recess only the sensor region, leaving the alumina region planar with the air bearing surface. The contact point can be on the alumina at the extreme trailing edge.

DETAILED DESCRIPTION OF THE PREFERRED EMBODIMENT

Figure 1:
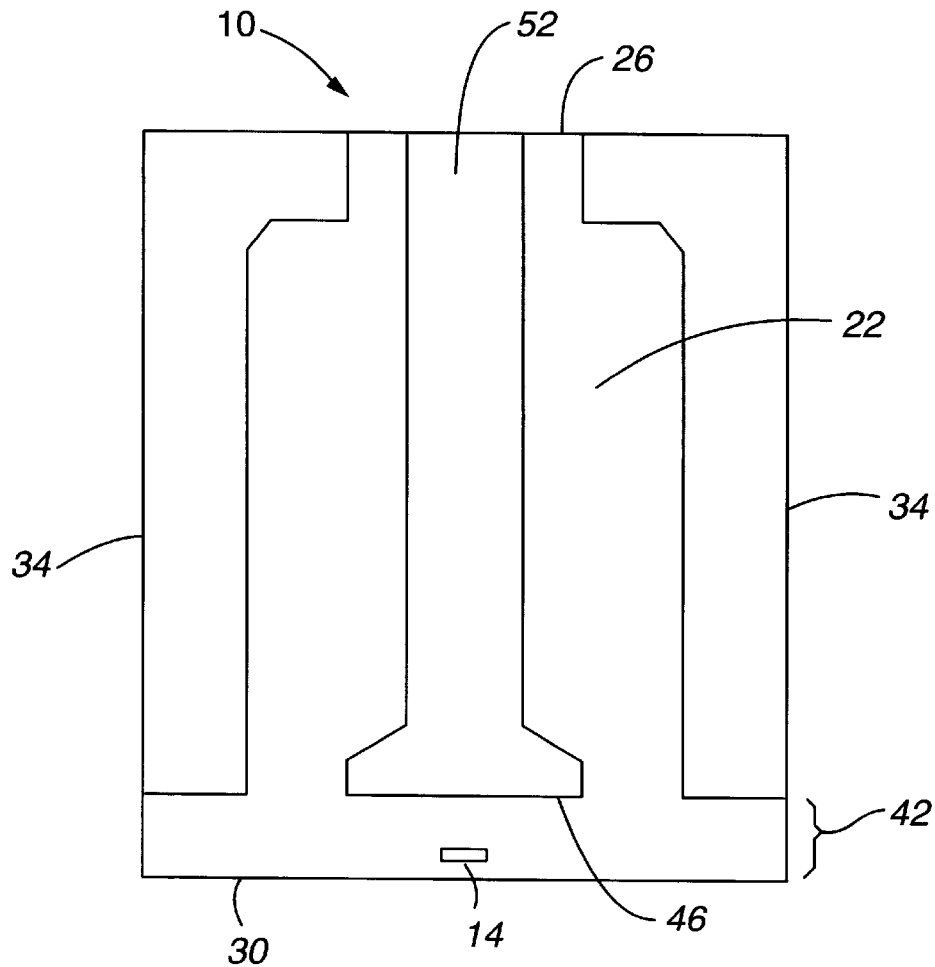
FIG. 1 is a bottom surface view of a slider of the present invention.
Figure 2:
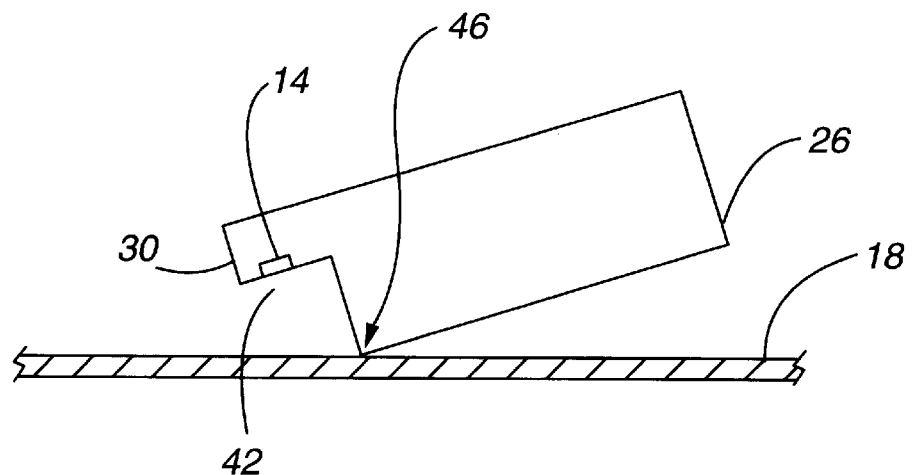
FIG. 2 is a side view of a slider of the present invention which is in contact with a recording medium.

The present invention provides a method and apparatus for improving the use of magnetic-resistive heads in pseudo-contact and in-contact recording systems through intentional transducer recession. The present invention is particularly useful in a hard disk drive system which uses a magneto-resistive head to read information from a magnetic disk.

The present invention will be described with regard to the accompanying drawings in FIGS. 1–4C which assist in illustrating various features of the invention. In one embodiment of the present invention, a slider 10 for positioning a transducer 14 relative to a recording medium 18 is provided. The slider 10 comprises an air-bearing surface (ABS) 22 having a recessed portion 42 adjacent to a trailing edge 30, a contact portion 46 disposed in front of the recessed portion 42, a leading edge 26 located opposite the trailing edge 30, and a magneto-resistive transducer 14 which is disposed within the recessed portion 42. The magneto-resistive transducer 14 is disposed at the recessed portion 42 such that when the contact portion 46 is in contact with the recording medium 18, and the magneto-resistive transducer 14 is spaced above the recording medium 18. The recessed portion 42, facing a rotating recording medium 18, can be intentionally produced using any of the known methods including conventional slider lapping and cleaning techniques, polishing and sputter etching.

The slider 10 is made of a various ceramic materials. A composition of alumina and titanium-carbide is one of the more common slider materials in use today due to its relative wear resistance. This wear resistance property of alumina and titanium-carbide ceramic material can be used in the air-bearing surface of the slider 10 having a contact portion 46; however, this wear-resistance property also makes it more difficult to produce a recessed portion 42 in the ABS of the slider 10. One can achieve having both wear-resistance property in a contact portion 46 and the ability to relatively easily introduce a recessed portion 42 by having the slider 10 that is composed of at least two different materials. For example, the contact portion 46 of the slider 10 can be composed of a wear-resistant ceramic composition such as alumina-titanium-carbide, silicon carbide or a deposited film of carbon. Whereas, the portion of the ABS 22 which ultimately forms the recessed portion 42 can comprise ceramic composition which can be selectively removed, for example, alumina.

The slider is designed such that the contact portion 46 remains in front of the transducer 14 on the slider. To prevent excessive wear caused by the constant contact between the contact portion 46 and the recording medium 18, the contact portion 46 is composed of a wear-resistant material as discussed above. In addition, the recording medium 18 can be coated with a lubricant to reduce the friction.

Positioning the transducer 14 at a recessed portion 42 allows the transducer (e.g., a magneto-resistive (MR) recording element) to achieve a predictable and significantly reduced physical and magnetic spacing with a rigid recording medium without resulting in thermal asperities. Preferably the recessed portion 42 is from about 5 nm to about 15 nm. This spacing prevents the transducer 14 from physically coming in contact with the recording medium 18. In addition, because the invention utilizes a contact or pseudo-contact slider, the spacing is achieved without having to employ expensive manufacturing and assembly techniques. Moreover, the present invention eliminates or reduces manufacturing tolerances.

The spacing between the transducer 14 and the recording medium 18 is determined by many factors such as a slider pitch angle, a dynamic pitch response, and a slider crown. Any of these factors can be adjusted to achieve a desired spacing between the recording medium 18 and the transducer 14.

A slider pitch angle refers to the angle formed between the recording medium 18 and the slider 10. A steep slider pitch angle requires a relatively deeper recession to avoid having the transducer 14 coming in contact with the recording medium 18, whereas a small slider pitch angle requires smaller recession. A typical slider pitch angle is from about 100 microradians to about 400 microradians, more preferably from about 150 microradians to about 200 microradians, and most preferably from about 150 microradians to about 160 microradians. In a particularly useful embodiment, the slider pitch angle is about 150 microradians.

Figure 3A:
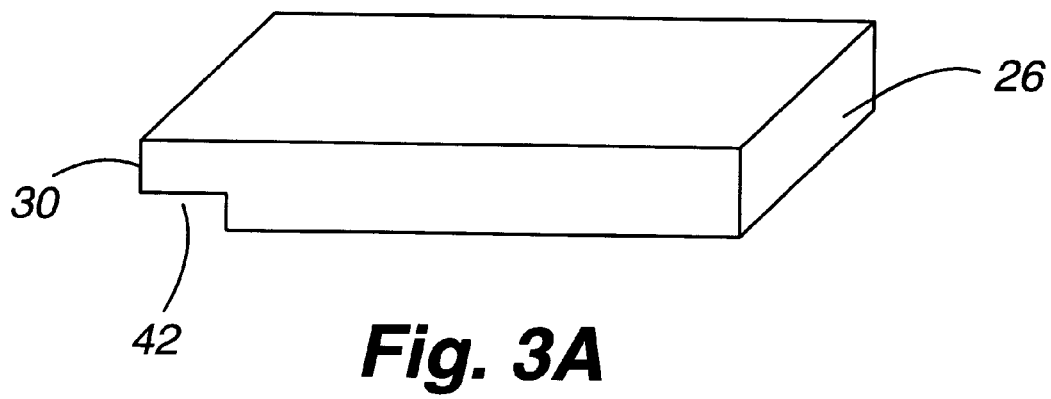
FIG. 3A is a perspective view of a slider of the present invention having a relatively flat shaped configuration.
Figure 3B:
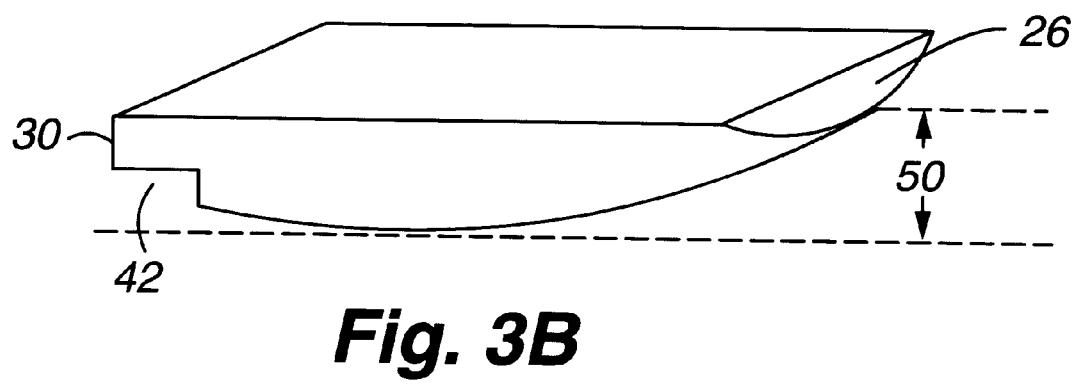
FIG. 3B is a perspective view of a slider of the present invention having a relatively semicylindrical-shaped configuration.
Figure 3C:
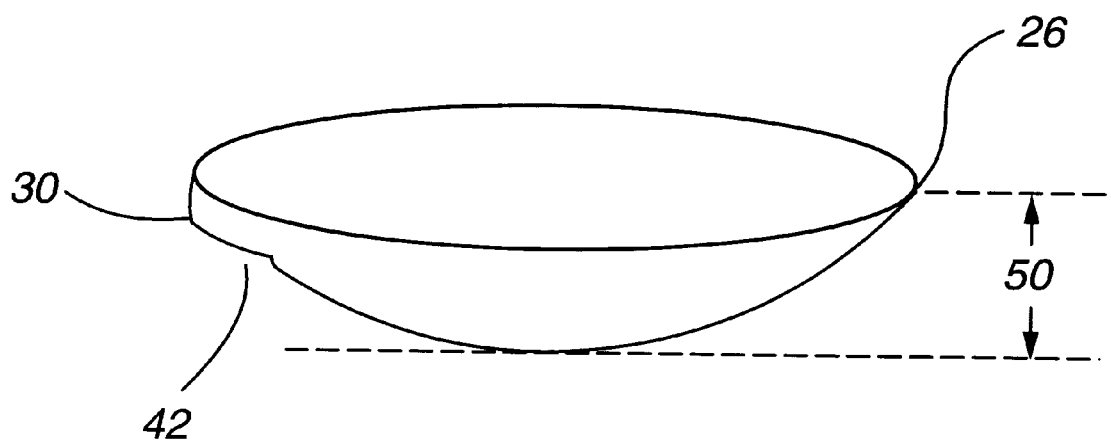
FIG. 3C is a perspective view of a slider of the present invention having a relatively bowl-shaped configuration.
Figure 4A:
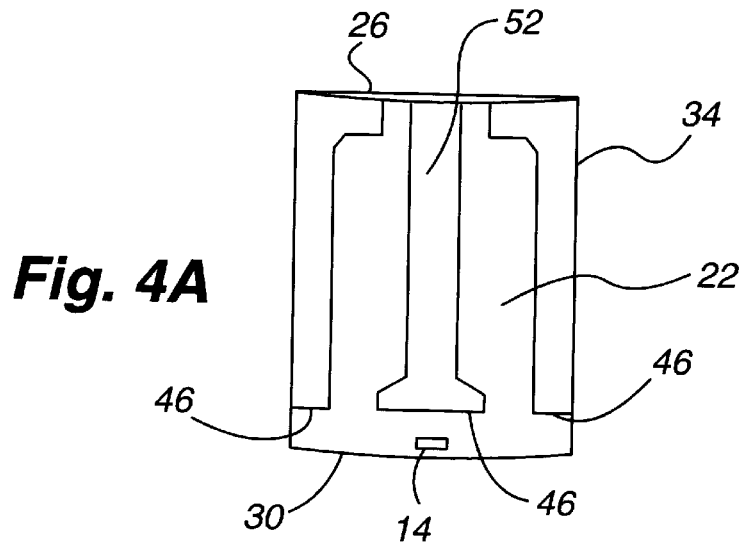
FIG. 4A is a bottom view of a slider of the present invention having a relatively flat shaped configuration.
Figure 4B:
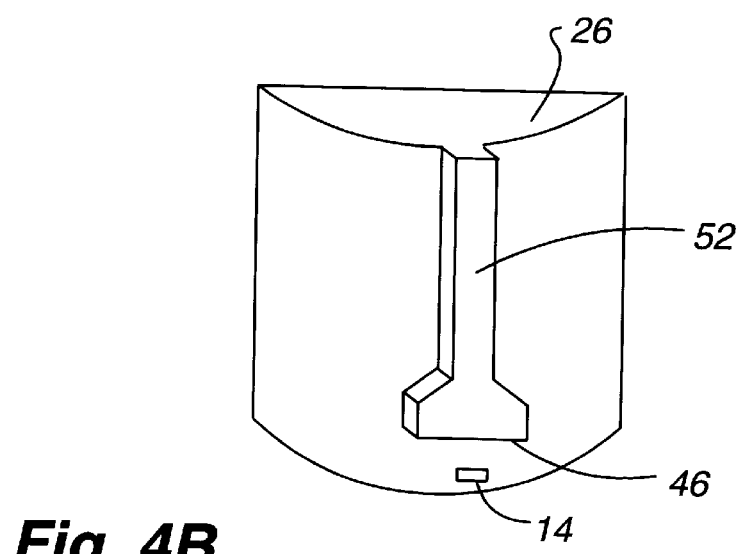
FIG. 4B is a bottom view of a slider of the present invention having a relatively semicylindrical-shaped configuration.
Figure 4C:
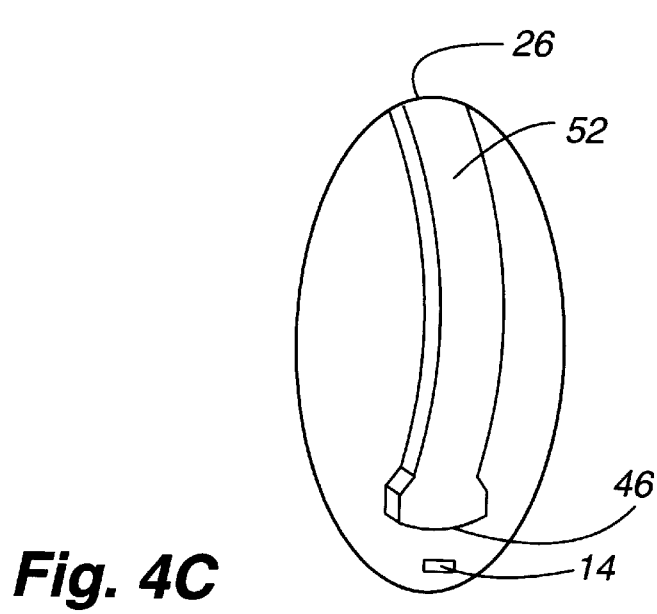
FIG. 4C is a bottom view of a slider of the present invention having a relatively bowl-shaped configuration.

The ABS 22 of the slider 10 can be of any shape. Exemplary shapes of the ABS 22 of the slider 10 which are useful for the present invention are shown in FIGS. 3A–3C, and they include a relatively flat, semicylindrical-shaped, and bowl-shaped configurations, respectively. Preferably the ABS is bowl-shaped or semicylindrical-shaped. When the ABS 22 is bowl-shaped or semicylindrical-shaped, the leading edge 26 of the slider 10 is raised above the plane of the recording medium when the slider 10 is at rest. This height 50 is called a "slider crown". (See, for example, FIGS. 3B and 3C). Preferably the slider crown 50 is from about 50 nm to about 75 nM, for a 50% form factor slider. And the slider crown 50 is from about 30 nm to about 50 nm for a 30% form factor slider. A form factor slider refers to de facto industry standard slider configuration having a dimension of 0.159 inch (length)×0.125 inch (width)×0.034 inch (height).

Since the recording mechanism of the present invention does not involve a direct contact between the transducer 14 and the recording medium 18, thermal transients are eliminated, or significantly reduced to the extent that thermal variations are insulated from the transducer by the slider body material, or other insulating materials which can be deposited before the transducer 14. Useful insulating materials include alumina.

Unlike other currently available pole-tip recessed sliders, the slider 10 of the present invention is not designed to "fly" above the recording medium 18 when the recording medium is rotated by a spin motor means. But rather the contact portion 46 of the slider 10 is designed to be in a pseudo-contact with the recording medium 18, i.e., the slider 10 actually contacts the recording medium 18 for a significant amount of time even when the recording medium 18 is spinning. It will be appreciated that this contact can be continuous or it can be intermittent due to a various factors such as the surface texture of the recording medium 18. This contact between the slider 10 and the recording medium 18 results in a significant reduction of height variation between the transducer 14 and the recording medium 18 compared to a flying head recording mechanisms. The height variation between the slider 10 and the recording medium 18 in the present invention is reduced by at least about 50% compared to a non-contact recording head, more preferably at least about 60%, and most preferably at least about 75%. Alternatively, the height between the slider 10 and the recording medium is preferably about 0.6 microinches ($\mu$in), more preferably about 0.4 $\mu$in, and most preferably about 0.2 $\mu$in. And because the slider 10 does not fly above the recording medium 18, the recording system of the present invention is significantly less sensitive to gram load, altitude, and static attitude compared to flying head recording mechanisms.

The spinning recording medium 18 creates an air movement around the slider 10 which can cause the slider to be lifted above the recording medium 18. To prevent this "flying" of the slider 10, the slider contact force is kept at a level such that a significant amount of contact is maintained between the slider 10 and the recording medium 18 during the normal operation of the recording system. For a recording system having the recording medium spinning at about 5400 rpm, the slider contact force is from about 100 mg to about 500 mg, more preferably from about 100 mg to about 300 mg, and most preferably from about 100 mg to about 200 mg.

The amount of friction between the contact point 46 of the slider 10 and the recording medium 18 can affect the amount of heat that is generated which can cause loss of data in the recording medium 18. In addition, high friction between the contact point 46 and the recording medium 18 results in more power consumption by the recording system. The amount of friction generated by sliding the contact point 46 across the surface of the recording medium 18 is a function of a coefficient of friction. Preferably the coefficient of friction is from about 0.3 to about 1.0, more preferably from about 0.3 to about 0.6, and most preferably from about 0.3 to about 0.4.

The slider 10 can have one or more side rails 34 that extend substantially from the leading edge 26 to the trailing edge 30. Although the side rails 34 are represented in FIG. 1 as being a straight edge, it can be any variety of shape such as a curve or a zig-zag shape.

The slider 10 can also have a center rail 50 that extends substantially from the leading edge 26 to the trailing edge 30. The design of the air-bearing surface is selected such that the air-bearing surface does not generate an excess amount of lift when the recording medium 18 is spinning. This helps maintain pseudo-contact of the slider with the recording medium 18. In a particularly useful embodiment of the present invention the slider 10 has two side rails 34 and a center rail 50.

By reducing the effective distance between the MR head and the recording medium, the present invention provides a recording system that has a high signal to noise ratio.

The slider 10 can also have a thin film transducer (e.g., an inductive head) to allow writing of magnetic information on the recording medium 18. Presence of both MR-head and a thin film transducer provides a magnetic recording system which can read and write desired information on the recording medium.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A disk drive, comprising:
   a recording medium; and
   a pseudo-contact slider, including
     an air-bearing surface directed to face said recording medium;
     a leading edge;
     a trailing edge located opposite said leading edge;

a recessed portion disposed proximate to said trailing edge;

a contact portion disposed in front of said recessed portion such that a significant amount of contact is maintained between said contact portion and said recording medium during normal operation of said disk drive; and a magneto-resistive transducer disposed at said recessed portion such that when said contact portion is in contact with said recording medium, said magneto-resistive transducer is spaced above said recording medium.

2. The disk drive of claim 1, wherein said magneto-resistive transducer is spaced from about 5 nm to about 15 nm above said recording medium when said recording medium is spinning in operation.

3. The disk drive of claim 1, wherein said slider further comprises two side edges and two side rails along said air-bearing surface disposed substantially near each of said two side edges.

4. The disk drive of claim 1, wherein said slider further comprises a center rail that extends along said air-bearing surface from essentially said leading edge along the length of said slider.

5. The disk drive of claim 1, wherein said recessed portion is recessed from about 5 nm to about 15 nm from said air-bearing surface.

6. The disk drive of claim 1, wherein said slider further comprises an insulation adjacent to said transducer.

7. A hard disk drive assembly, comprising:

a recording medium;

spin motor means for rotating said medium;

a head positioned adjacent to said medium, said head having a bottom surface; and a pseudo-contact slider located at said bottom surface of said head, wherein said slider comprises a leading edge, a trailing edge, an air bearing surface, a contact portion and a magneto-resistive transducer disposed proximate to said trailing edge such that said contact portion maintains a significant amount of contact with said medium during reading and writing operations, and said magneto-resistive transducer is spaced above said medium during said reading and writing operations.

8. The assembly of claim 7, wherein said magneto-resistive transducer is spaced above said medium by disposing said magneto-resistive transducer in a recessed portion of said slider, wherein said recessed portion is disposed proximate to said trailing edge of said slider and said contact portion is disposed in front of said recessed portion.

9. The assembly of claim 7, wherein said slider further comprises a center rail and two side rails extending on both sides of said center rail substantially from said leading edge of said slider to said trailing edge of said slider.

10. The assembly of claim 7, wherein said slider is constructed from a first material, said magneto-resistive transducer is disposed in a matrix of a second material at the trailing edge of said slider, said first material has certain characteristics and said matrix has different characteristics.

11. The assembly of claim 10, wherein said first material is selected from the group consisting of alumina-titanium carbide, and silicon carbide.

12. The assembly of claim 10, wherein said second material is selected from the group consisting of alumina, carbon and a mixture thereof.

13. The assembly of claim 10, wherein said magneto-resistive transducer is spaced from about 5 nm to about 15 nm from the plane of said air bearing surface of said slider.

* * * * *